(No Model.)
W. H. THURMAN.
CONNECTION FOR WAGON TRAINS.
No. 449,980. Patented Apr. 7, 1891.
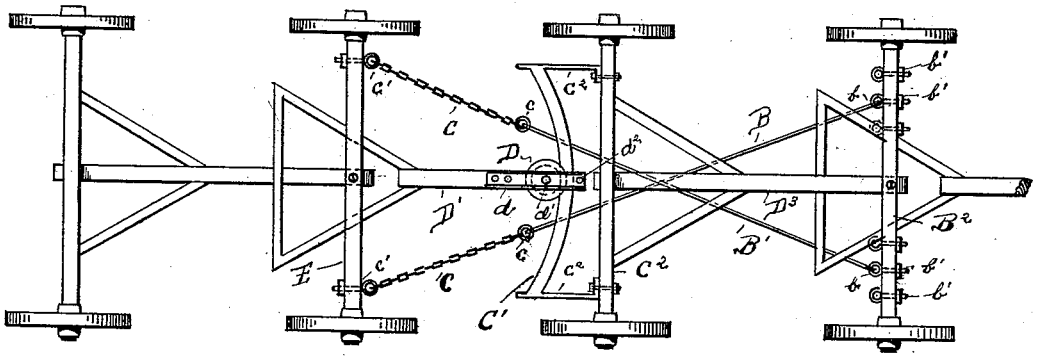
Fig. 1.
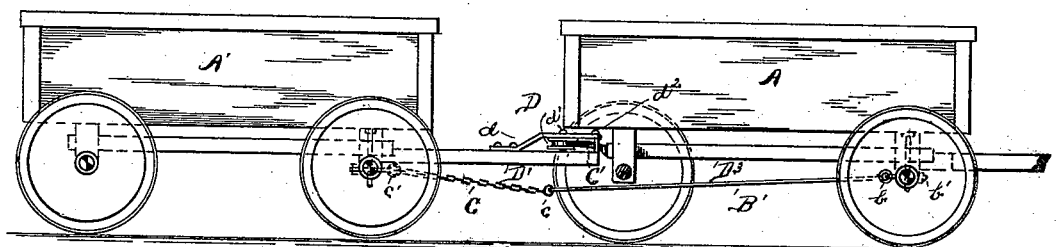
Fig. 2.
Fig. 3.
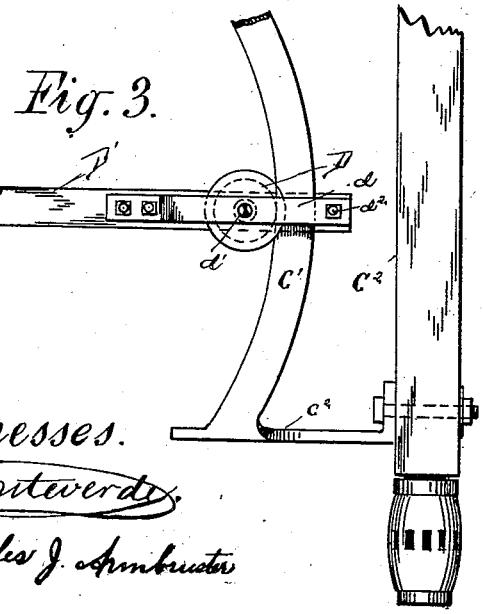
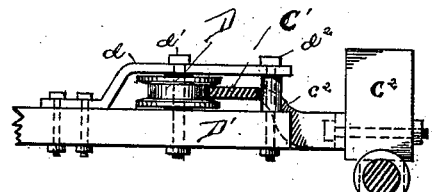
Fig. 4.
Witnesses.
J. Monteverdi
Charles J. Armbruster
Inventor
William H. Thurman
By Boone & Acker

UNITED STATES PATENT OFFICE.

WILLIAM H. THURMAN, OF FISH CAMP, CALIFORNIA.

CONNECTION FOR WAGON-TRAINS.

SPECIFICATION forming part of Letters Patent No. 449,980, dated April 7, 1891.

Application filed September 13, 1890. Serial No. 364,868. (No model.)

*To all whom it may concern:*

Be it known that I, WILLIAM H. THURMAN, a citizen of the United States, residing at Fish Camp, in the county of Mariposa and State of California, have invented certain new and useful Improvements in Connecting Mechanism for Wagon-Trains; and I do hereby declare the following to be a full, clear, and exact description of said invention, such as will enable others skilled in the art to which it most nearly appertains to make, use, and practice the same.

My invention has relation to certain new and useful improvements in mechanism for securing or connecting together trail-wagons, which consists of the parts and details of construction, as will be hereinafter more fully set forth in the drawings, and described and pointed out in the specification.

The object of my invention consists in providing mechanism whereby the lead-wagon of the train may be so secured to the trail-wagon as to cause the latter to follow directly in its line of movement without swerving therefrom, consequently obviating the liability of being thrown from the trail when rounding dangerous curves through the mountain-passes.

My invention further has for its object to relieve the horses from unnecessary strain in rounding or turning curves, thereby overcoming danger of slipping or stumbling on the trail or being thrown therefrom; and my invention further consists in providing mechanism which shall be simpler in its construction, more effective in its operation, and less expensive than any device of a similar nature heretofore known to me.

Referring to the drawings forming a part of this application, wherein similar letters of reference are used to denote corresponding parts throughout the entire specification and several views, Figure 1 is a top plan view of the running-gear, showing my improved mechanism secured thereunder; Fig. 2, a side elevation; Fig. 3, a detail view of the arc guide, showing end of trail-tongue secured thereon; and Fig. 4, a detail longitudinal section thereof in side elevation.

The letter A represents the lead-wagon, and A' the trail. Beneath the running-gear of said lead-wagon I locate the connecting mechanism, which consists of the rods B B', secured movably within the eyed end $b$ of bolts $b'$, secured to the cross-beam or axle $B^2$ of said running-gear. The rods B B' run transverse to each other and project to the rear of the lead-wagon and have the projecting ends thereof provided with rings $c$. To said rings I couple the forward ends of chains C, the rear ends thereof being secured to screw-eyes $c$, passing through axle E. Projecting rearwardly from the lead-wagon is the arc guide-bar C', which is secured to the rear axle $C^2$ by means of the stops $c^2$. Upon said arc guide, which is constructed upon the radius of a true circle, works the sheave or roller D, which is secured to the forward end of the trail-wagon tongue by means of plate or strap $d$, and is adapted to rotate upon axle $d'$. By means of the bolt $d^2$ passing through plate or strap $d$ and tongue D', I form a stop for the movement of the tongue, inasmuch as the same will upon the full movement thereof come in contact with stops $c^2$. By securing the bolt $d^2$ through the ends of strap $d$ and tongue D', I gain sufficient space between said bolt and arc guide to allow for a limited play of the trail-wagon tongue. When not in use, the transverse rods and connecting-chains may be readily detached from the wagons or tied to the running-gear, as desired. The axle $B^2$ has secured thereto three or more adjustable eye-bolts $b'$ on each side of the connecting-rod $D^3$. By securing the ends of transverse rods in either outer or inner eyebolts $b'$, I gain an increase or decrease in the radial travel of the trail-wagon.

In rounding heavy or dangerous mountain curves the lead-wagon, if turning to the left, draws upon transverse rod B', which, being connected to the left end of axle E of the trail-wagon, necessarily turns the same to the right in an opposite direction to the travel of the fore wheels of the train or lead wagon, thus causing the trail-wagon to travel in line with the rear wheels of the lead-wagon. When moving to the right, transverse rod B acts upon the right end of beam E and changes the motion of the trail-wagon to the left, thus keeping and maintaining the trail-wagon in line with the movement of the lead-wagon. As the lead-wagon turns from right to left, the power necessary to change the movement of trail-wagon is thrown upon the opposite end of cross-beam or axle $B^2$, thus greatly assisting and relieving the horses from the strain necessary to maintain the tongue of train or lead wagon in line or position.

In case more than two wagons are used in the trail the second and third should be secured by running the rods B B' longitudinally and not transverse, inasmuch as should the same be run transversely the third wagon would travel while rounding curves in a direction opposite to that of the trail-wagon or in the same direction with the travel of the lead-wagon, which is the difficulty sought to be overcome. However, by running the rods longitudinally I secure travel of the third wagon corresponding with that of the trail-wagon. By forming the arc guide-bar on a true circle the relative position of the lead and trail wagon always remains the same.

I am aware that minor changes may be made in the details of construction and arrangement of parts herein shown and described without creating or necessitating a departure from the nature and scope of my invention.

Having thus described my invention, what I claim as new, and desire to secure protection in by Letters Patent of the United States, is—

1. The mechanism for maintaining the trail-wagon of a wagon-train in line with the lead-wagon, consisting of the transverse rods or chains connected with the trail-wagon so as to cause the same to be given a curve corresponding with the curve of the lead-wagon, substantially as set forth.

2. The mechanism for maintaining the trail-wagon of a wagon-train in line with the lead-wagon, consisting, in combination, of the adjustable transverse rods, connecting-chains coupled thereto, and of the adjustable eye-bolts secured to the trail-wagon, adapted to have secured thereto the connecting-chains, substantially as set forth and described.

3. The combination, with the connecting mechanism of a wagon-train, of the guide-brace secured to the train or lead wagon, sheave adapted to work upon said brace, and of the retaining-strap for holding the sheave in position, substantially as set forth and described.

4. The combination, with the connecting mechanism of a wagon-train, of the guide-brace secured to the train-wagon, sheave adapted to work upon said brace, retaining plate or strap secured to the tongue of the trail-wagon for maintaining the sheave in position, said plate or strap overlapping and extending beyond the brace, and of the bolt connecting the end of strap and tongue so as to form a stop, substantially as set forth and described.

In testimony whereof I affix my signature in presence of two witnesses.

WILLIAM H. THURMAN.

Witnesses:
N. A. ACKER,
CHARLES J. ARMBRUSTER.